United States Patent [19]

Kinoshita

[11] 4,109,983
[45] Aug. 29, 1978

[54] SPEAKER CABINET

[75] Inventor: Shouzo Kinoshita, Tokorozawa, Japan

[73] Assignee: Pioneer Electronic Corporation, Tokyo, Japan

[21] Appl. No.: 775,016

[22] Filed: Mar. 7, 1977

Related U.S. Application Data

[63] Continuation of Ser. No. 606,894, Aug. 22, 1975, abandoned.

[30] Foreign Application Priority Data

Aug. 22, 1974 [JP] Japan .............................. 49-99663[U]
May 28, 1975 [JP] Japan ................................. 50-63020

[51] Int. Cl.² ............................................ A47B 81/00
[52] U.S. Cl. ................................ 312/214; 312/7 TV; 181/199; 428/311
[58] Field of Search ................ 312/214, 7 TV, 357; 181/199, 198; 428/310–314, 322; 220/9 F; 178/7.9

[56] References Cited

U.S. PATENT DOCUMENTS

| | | | |
|---|---|---|---|
| 3,357,585 | 12/1967 | Morrison | 220/9 F |
| 3,443,007 | 5/1969 | Hardy | 264/321 |
| 3,708,385 | 1/1973 | Immethun | 161/69 |
| 3,735,041 | 5/1973 | Fujita | 312/7 TV |
| 3,753,843 | 8/1973 | Hutchison | 161/43 |
| 3,763,858 | 10/1973 | Buese | 428/311 |
| 3,944,704 | 3/1976 | Dirks | 428/311 |
| 3,989,781 | 11/1976 | Chant | 428/311 |

Primary Examiner—Paul R. Gilliam
Assistant Examiner—Victor N. Sakran
Attorney, Agent, or Firm—Sughrue, Rothwell, Mion, Zinn and Macpeak

[57] ABSTRACT

A speaker cabinet is constituted with plate material formed by intimately bonding a rigid foam plate having communicating or open-cell bubbles to a surface plate material with the latter being outside.

4 Claims, 6 Drawing Figures

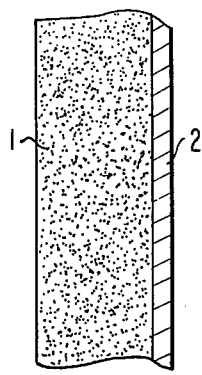 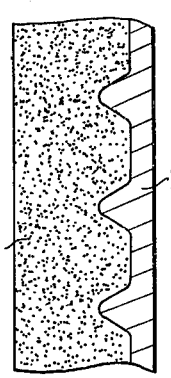 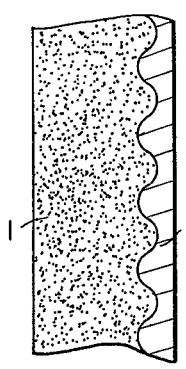 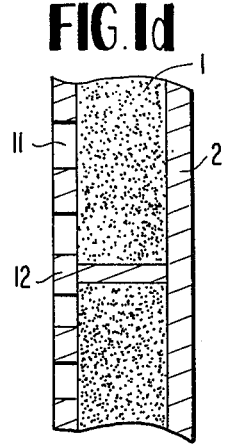
FIG.1a  FIG.1b  FIG.1c  FIG.1d
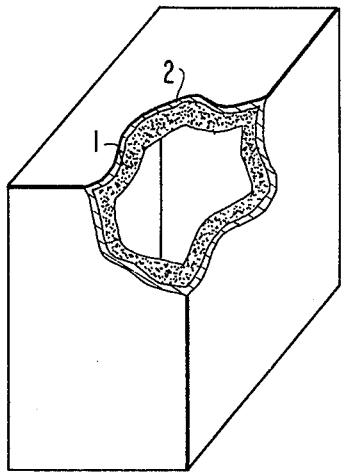
FIG.2
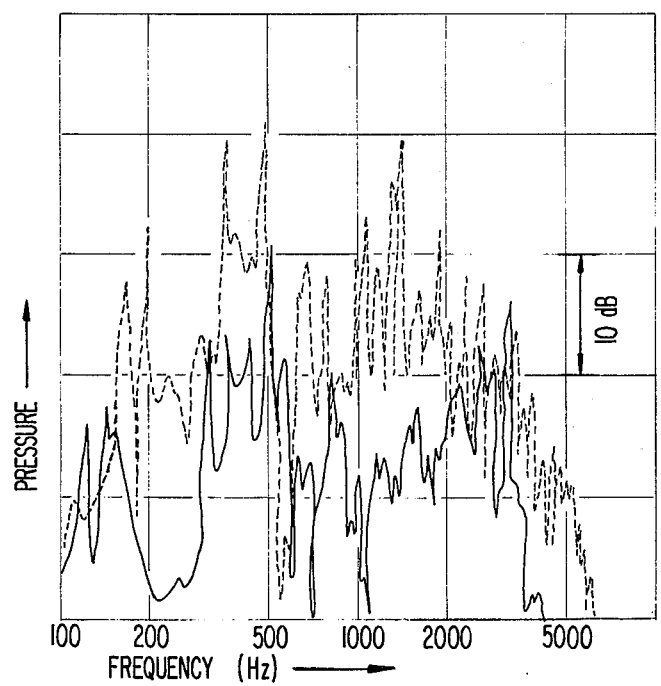
FIG.3

SPEAKER CABINET

This is a continuation of application Ser. No. 606,894, filed Aug. 22, 1975, now abandoned.

FIELD OF THE INVENTION

The present invention relates to an improvement on a speaker cabinet for use in, in particular, audio reproducing system.

BACKGROUND OF THE INVENTION

A cabinet for speaker requires a considerable mechanical strength because of the necessities of prevention of mechanical vibration and of provision of good sound shielding. In general, relatively expensive wooden plate material such as plywood or particle board etc. is used to form the cabinet and the thickness of the plate is 15 to 25 mm for relatively small cabinet (about 50 liters) and 25 to 40 mm for relatively large size cabinet. Even when such relatively thick plate is used, some resonance occurs due to the relatively large Q of such material, resulting in insufficient prevention of vibration and sound shielding effect. In order to resolve this problem, it is considered to increase the thickness of the plate material. However, by doing so, the internal volume of the cabinet is considerably reduced, causing the producing characteristics for low frequency band to degrade. That is, the lowest resonance frequency $fc$ (Hz) of the cabinet system and the equivalent stiffness $Sc$ (dyne/cm) of the cabinet can generally be expressed as follows:

$$fc = fo\sqrt{1+(Sc/So)} \qquad (1)$$

$$Sc = (1.4 \times 10^7 \cdot a^4)/Vc \qquad (2)$$

where $fo$ is the lowest resonance frequency of the speaker unit in Hertz. $So$ is the stiffness of the supporting structure of the speaker unit in dyne/cm, the speaker unit $a$ is the equivalent vibration radius of the speaker unit in cm and $Vc$ is the internal volume of the cabinet in cm$^3$.

Therefore, if the internal volume of the cabinet is small, the lowest resonance frequency $fc$ increases and hence the critical level of a low frquency reproduction shifts up. This tendency is enhanced in the compact system of bookshelf type, result in that the lowest resonance frequency $fc$ is goverened by the equivalent stiffness $Sc$ almost completely. In designing the speaker cabinet, the most significant limitation is the outer dimensions because the size of the cabinet is to be as small as possible due to the spatial restriction. Under the circumstances, it is clear that it is undesirable to increase the thickness of the cabinet wall because the increase of thickness causes the internal volume to decrease to thereby degrade the low frequency reproduction characteristics. For example, when it is desired to fabricate a cabinet dimensioned as 630 mm (height) × 330 mm (width) × 300 mm (depth) with plate material having a thickness $t = 25$ mm, the overall volume becomes about 68 liters, while the internal volume is about 45 liters, a space of about 23 liters is occupied by the plate material itself. That is, heretofore, both the mechanical strength and the internal volume have been considered to seek a practical compromise therebetween and, therefore, it has been impossible to obtain good results in both the mechanical strength and the internal volume.

It has been proposed to utilize foamed concrete material or concrete material in fabricating the cabinet, which provides a good mechanical strength, sound shielding effect and anti-vibration effect etc., the last two being due to the weight of the material. It has also been proposed to utilize plate material of foamed styrol having continuous (i.e. closed-cell) rubbles, etc., with a provision of a hard outer membrane or with gradually decreasing the foaming degree towards the outer surface to make it air-tight while improving the sound absorption characterictics of the inside portion of the plate which permits the elimination of sound absorbing material such as glass wool etc. In these cases, however, in order to obtain a satisfactory strength as a cabinet and to obtain a desired internal volume thereof, the foamed material must be fabricated in block form or the foaming degree thereof must be made small enough. In particular, when foamed material blocks are employed, the sound propagating velocity in air in the vicinity of the speaker is lowered to an extent that a large load is applied to the speaker, result in that it is difficult to obtain a good reproduction of sound in low frequency band.

SUMMARY OF THE INVENTION

The present invention was made in view of the above mentioned problems in the conventional techniques and it is an object of the present invention to provide a speaker cabinet having satisfactory mechanical strength while keeping the internal volume thereof large enough to eliminate the degradation of the sound reproduction.

The object is achieved according to the present invention by fabricating a cabinet with a foamed plate material provided on the outer surface thereof with a thin material which has a low permeability for air.

Other objects and features of the present inventon will become apparent from the description of preferred embodiments of the invention with reference to the accompanying drawings.

BRIEF DESCRIPTION OF THE DRAWING

FIGS. 1a–1d show fragmentally, in cross-section, cabinet walls according to embodiments of the present invention;

FIG. 2 is a partially cross-sectioned perspective view of the speaker cabinet fabricated in accordance with the present invention, and FIG. 3 is a comparative data showing the vibration cbaracteristics of the wall of the present speaker cabinet.

DESCRIPTION OF THE EMBODIMENTS

FIGS. 1a–1d are cross-sectional view of the cabinet wall material of the present invention in which a reference numeral 1 shows a foamed material such as foamed aluminum or foamed concrete having specific weight, for example, in a range 0.3 to 0.6 etc. Although the outer surface of the foamed material 1 is shown in FIG. 1a as flat, it may be changed in various manners. For example, it may be of corrugated plane to improve the sound absorbing performance and to prevent the generation of standing wave, as shown in FIG. 1b or 1c. A reference numeral 2 is a relatively thin and dense surface material such as thin wooden plates having thickness of, for example, several millimeters, thin metal plate having thickness of, for example, 1 to 2 millimeters or some painted membrane, which does not provide a good permeability for air. The surface material 2 is intimately bonded to the foamed body material 1 when or after the foaming process of the latter is performed.

In this case, in order to strengthen the resultant plate, the inner surface of the surface material 2 may be corrugated as shown in FIGS. 1b or 1c or it may be possible to first impregnate a synthetic resin etc. onto the inner surface of the foamed material 1 and solidify the resin and then to bond the surface material thereto.

Alternatively, it may be possible to put the foamed material 1 between the surface plate 2 and a reinforcing plate 12 having a plurality communication holes 11 as shown in FIG. 1d. In the latter case, the strength of the resultant plate may be much increased.

The plate thus formed is utilized in fabricating the speaker cabinet with the surface material 2 being outside and the foamed material 1 being inside.

According to the present invention, many advantages are realized which are to be described. Firstly, no resonance of the cabinet occurs. This is because the foamed material is reinforced resulting in that the plate vibration (resonance) due to the fundamental vibration attitude is hardly occurred and, in addition, because the internal energy loss is increased due to the presence of the foamed material and the vertical wave (sonic wave) produced in the foamed material is immediately absorbed thereby, resulting in that the resonance is further kept down. For these reasons, there is substantially no possibility of mixing undersired sounds in the desired sounds from the speaker.

Secondly, it is possible to close the effective internal volume of the cabinet to the whole cabinet volume defined by the outermost walls thereof. Because of the presence of the foamed material inside of the cabinet, which material contains a large number of communicating (open-cell) bubbles, the volume of air in the material is very large and, therefore, the acoustically available volume of air in the cabinet becomes, in effect, substantially the same as one defined by the outer walls thereof. Accordingly, in contrast to the conventional design of the cabinet in which the outer dimensions are fixed and the thickness of the wall material is increased to increase the structural strength with a resultng of corresponding decrease of the internally available volume, the cabinet according to the present invention has no such self-contradistinctory problem as the above and remarkably improve the ability of low frequency sound reproduction.

As an example, a cabinet having 630 mm height, 360 mm width, 290 mm depth and 25 mm outer wall thickness has a whole volume of about 65.7 liters and an inner volume of about 43.0 liters. In this case, since the whole volume may be considered as the inner volume in the present invention, the effective acoustical inner volume can be about 1.5 times the actual or physical inner volume defined by the internal dimension of the cabinet. Therefore, the effective inner volume provided by the present invention becomes larger than the conventional cabinet by, in general, 20% to 50%. This means that in an air suspended speaker system, the lowest resonance frequency $fo$ can be lowered by 9 to 18% in comparison with the conventional system and it becomes possible to remarkably improve the low frequency sound reproduction performance without any reduction of the sensitivity of speaker.

Thirdly, the thickness of the outer wall can be increased in the present invention. Since the inner volume of the cabinet is not so infuenced by the increase of the thickness of the foamed material, it becomes possible to determine the thickness of the foamed material in view of only the structural strength thereof.

It is noted, however, that, although the outermost surface material is relatively thin plate or membrane, it is directly bonded intimately thereto and, so, can provide a satisfactory structural strength as well as sound shielding and antivibration effects.

Fourthly, it becomes possible to decrease the amount of the sound absorbing material. Since the foamed material containing communicating (open-cell) bubbles has a sound absorbing property, it is possible to reduce the amount of the sound absorbing material to be provided in the interior of the cabinet in comparison with the conventional cabinet.

Fifthly, due to the utilization of the foamed material which is rigid structurally, a satifactory mechanical strength can be obtained without necessity of increasing the wall thickness excessively, in comparison with the conventional cabinet. Therefore, it is possible to retain a sufficiently large pure space within the cabinet and, due to this fact, there is no possibility of being exerted a large load on the speaker which is caused by the reduction of propagating velocity of sound in air in the vicinity of the speaker, resulting in a good low frequency sound reproduction.

Finally, a comparative data of the back plate vibration of the present speaker cabinet and the conventional one is shown in FIG. 3 in which a solid curve shows the data of the present cabinet and a dotted curve shows that of the conventional one.

The cabinet of the present invention which was used in obtaining the data had dimensions of 900 mm height, 450 mm width and 400 mm depth and was walled with a laminated plate comprising a foamed concrete plate containing communicating (open-cell) bubbles whose width was 35 mm and specific weight was 0.38 and a plywood plate having 9 mm thickness and bonded to the concrete plate. The conventional cabinet also used in this experiment was fabriated with plywood plate of 25 mm thickness so that the outer dimensions become the same as those of the present cabinet. The loud speakers incorporated in these cabinets respectively were identical and had a nominal diameter of 38 cm and the lowest resonance frequency $fo$ was 30 Hz. The lowest resonance frequency $fc$ of the speaker system after the speaker was incorporated therein was 49.4 Hz in the present cabinet and was 53-8 Hz in the wooden cabinet. It should be noted that although the apparent inner volume of the present cabinet was smaller than that of the conventional one, the $fc$ of the present cabinet was lower than that of the conventional and this explains clearly the effect of the present invention mentioned hereinbefore. It has been found that about 87% of the volume of the foamed concrete acts as a practical air space.

As shown in FIG. 3 which is the data obtained by comparatively measuring the vibrations of the back plates of the cabinets at the center portion thereof respectively, an attenuation of vibration by about 10dB or more was provided by the present cabinet in comparison with the conventional cabinet.

Although the foamed concrete has been described as the foamed material containing communicating bubbles, any other materials may be used so long as it can provide a mechanical strength required when formed and can contain bubbles not independent or closed-cell but communicating or open-cell.

While the invention has been described in detail and with reference to specific embodiments thereof, it will be apparent to one skilled in the art that various changes and modifications can be made therein without departing from the spirit and scope thereof.

What is claimed is:

1. An acoustically improved speaker cabinet for housing a speaker and having a plurality of walls each having an inner surface and an outer surface, and wherein each wall comprises a rigid, sound-absorbing open-cell foamed place containing communicating bubbles and forming said inner surface, and a surface plate intimately bonded to said foamed plate and forming the outer surface of the wall, said surface plate being relatively impermeable to air, whereby the effective acoustical interior volume of said cabinet is substantially larger than the actual physical volume thereof, and whereby resonant vibration of the cabinet is eliminated.

2. A speaker cabinet according to claim 1, wherein said foamed plate is of foamed concrete.

3. A speaker cabinet according to claim 2, wherein said foamed concrete has specific weight in a range 0.3 to 0.6.

4. A speaker cabinet according to claim 1, wherein said foamed plate is of foamed aluminum.

* * * * *